(12) United States Patent
Doi et al.

(10) Patent No.: US 6,367,982 B1
(45) Date of Patent: Apr. 9, 2002

(54) CYLINDRICAL ROLLER BEARING

(75) Inventors: Katsuo Doi; Takahiro Yoneda; Hiroshi Nishimura, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/644,023

(22) Filed: Aug. 23, 2000

(30) Foreign Application Priority Data

Aug. 26, 1999 (JP) ........................................ 1999-240072

(51) Int. Cl.$^7$ ............................................... F16C 33/34
(52) U.S. Cl. ........................ 384/565; 384/463; 384/553
(58) Field of Search ................................ 384/565, 553, 384/463, 554, 555

(56) References Cited

U.S. PATENT DOCUMENTS 5,823,686 A 10/1998 Murano et al.

FOREIGN PATENT DOCUMENTS

JP 9-49528 2/1997

*Primary Examiner*—Lenard A. Footland
(74) *Attorney, Agent, or Firm*—Dann, Dorfman, Herrell and Skillman, P.C.; Henry H. Skillman

(57) ABSTRACT

A cylindrical roller bearing includes a plurality of cylindrical rollers disposed between a circular outer race and a circular inner race without using a retainer. The inner and outer races are devoid of annular flanges extending radially from opposite axial ends of the races for controlling the position of the cylindrical rollers in an axial direction. A pair of thrust bearing plates are disposed on the opposite sides of the outer race for controlling the positions of the outer race and the cylindrical rollers in the axial direction. One or more of the cylindrical rollers are formed shorter than the other cylindrical rollers. With this arrangement, a skew of one or more of the cylindrical rollers, which may occur when the outer race is subjected to an axial load, is taken up by circumferential gaps formed between the shorter cylindrical roller and adjacent cylindrical rollers at opposite ends of the shorter cylindrical roller. Thus, rotation of the outer race is stable and abrasion between the end faces of the cylindrical rollers and the thrust bearing plates can be suppressed.

4 Claims, 1 Drawing Sheet

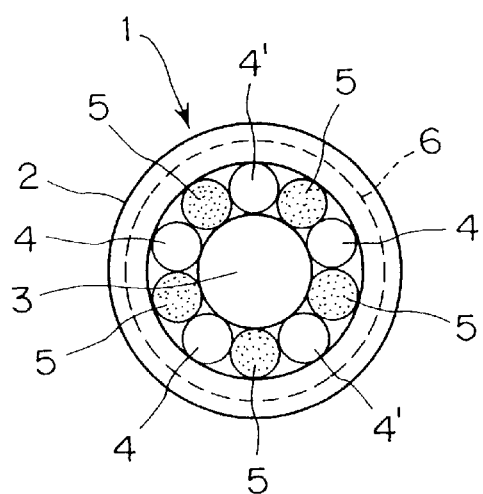
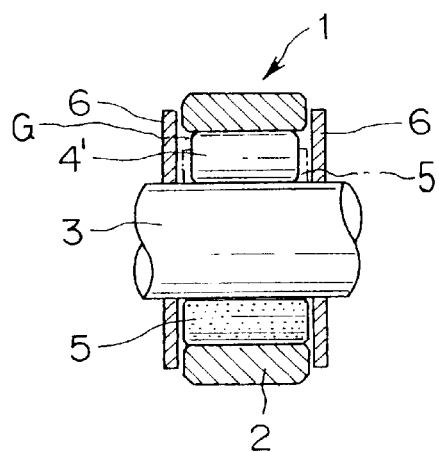
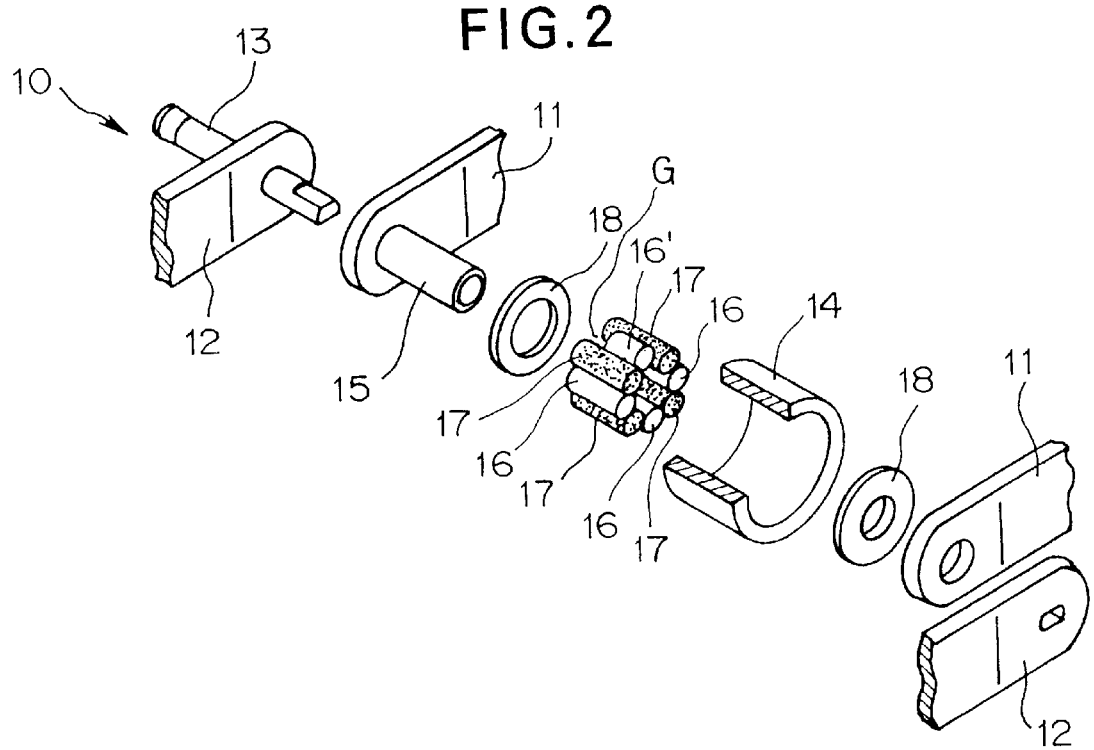

CYLINDRICAL ROLLER BEARING

BACKGROUND OF THE INVENTION

1. Field of the Invention

This invention relates to a cylindrical roller bearing.

2. Description of the Related Art

A roller chain is disclosed in Japanese utility Model Laid-Open Publication No. SHO-62-44579, wherein two inner plates and two outer plates disposed on both outer sides of the inner plates are connected together by a pin with a roller interposed therebetween the inner plates. The roller and the pin define therebetween an annular space in which a plurality of cylindrical rollers are disposed for rotation without using a retainer. A pair of annular side plates for controlling the positions of the plurality of cylindrical rollers in an axial direction are disposed at opposite end portions of an inner circumferential surface of the roller.

In the disclosed roller chain, the roller acts as an outer race of a cylindrical roller bearing, the plurality cylindrical rollers act as rolling members of the cylindrical roller bearing, and the pin acts as an inner race of the cylindrical roller bearing. Accordingly, the roller, the plurality of cylindrical rollers and the pin cooperatively form a so-called "open-type" cylindrical roller bearing which is devoid of a retainer for retaining or holding the cylindrical rollers within an annular space defined between the inner and outer races.

Japanese Patent Laid-Open Publication No. HEI-9-49528 and its related U.S. Pat. No. 5,823,686 discloses a chain for a conveyor in which a cylindrical roller bearing is incorporated. In the disclosed conveyor chain, a pair of inner plates are connected to each other by a bush, and a pair of outer plates are positioned in an overlapping relationship on the opposite outer sides of the pair of inner plates. The inner plates and the outer plates are articulately connected to each other by a pin extending through the bush. A plurality of cylindrical rollers made of steel and a plurality of cylindrical rollers made of resin are disposed alternately as rolling members on an outer periphery of the bush without using a retainer. A roller made of steel and having a pair of annular flanges extending from the opposite axial ends thereof in a radial inward direction is fitted for rotation on an outer periphery of the plurality of cylindrical rollers. Axial end faces of the cylindrical rollers of steel and resin are opposed to the inside surfaces of the annular flanges. Further, a pair of annular side plates are fitted on the outer periphery of the bush between the opposing inner faces of the pair of inner plates and the outer side faces of the roller. The pair of annular side plates control the position of the roller in its axial direction.

In the disclosed conveyor chain, the roller acts as an outer race of a cylindrical roller bearing, the cylindrical rollers made of steel and resin (polyethylene resin) act as rolling members of the cylindrical roller bearing, and the bush acts as an inner race of the cylindrical roller bearing. Accordingly, the roller, the cylindrical rollers made of steel and polyethylene resin, and the bush cooperatively form an unlubricated cylindrical roller bearing which is devoid of a retainer for holding the cylindrical rollers. Further, in the conveyor chain, since rotation of the roller is performed smoothly without being lubricated due to a self-lubrication property of the cylindrical rollers made of polyethylene resin, no maintenance is required. Consequently, the chain is particularly useful when embodied in a chain for conveyors designed for use in a field of food processing industry or the like wherein lubricating oil cannot be used.

However, in the roller chain disclosed in Japanese Utility Model Laid-Open Publication No. SHO-62-44579, when an axial load is applied to the roller (namely, the outer race of the cylindrical roller bearing), then a skew, that is, inclination of a cylindrical roller with respect to its normal axis of rotation, occurs with a plurality of cylindrical rollers (namely, the rolling members of the cylindrical roller bearing). When the roller rotates in this state, then a plurality of cylindrical rollers are displaced in an axial direction until end faces of the plurality of cylindrical rollers are contacted with, and slidably move on, one of the annular side plates. Thus, the roller chain is disadvantageous in that, by the sliding movement, abrasion occurs with the end faces of the plurality of cylindrical rollers and the annular side plates and this hinders smooth rotation of the roller.

Meanwhile, in the chain for a conveyor disclosed in Japanese Patent Laid-Open Publication No. HEI-9-49528, when the roller (outer race) is formed as a roller devoid of inwardly extending flanges for controlling the axial positions of the cylindrical rollers and the end faces of the cylindrical rollers of steel and resin (rolling members) are opposed to the annular side plates, an axial load applied to the roller would cause a skew of the cylindrical rollers of steel and resin in the same manner as the roller chain disclosed in Japanese Utility Model Laid-Open Publication No. SHO-52-44579 discussed above. When the roller rotates in this state, then a plurality of cylindrical rollers of steel and resin are displaced in an axial direction until the end faces of these cylindrical rollers are contacted with and slidably move on one of the annular side plates. By the sliding movement, abrasion occurs with the end faces of the plurality of cylindrical rollers of steel and resin and the annular side plates similarly, and this sometimes makes it difficult to use the chain for a long time without lubrication.

SUMMARY OF THE INVENTION

It is an object of the present invention to provide a cylindrical roller bearing wherein rotation of an outer race is stable against an axial load applied to the outer race and abrasion of an end face of a cylindrical roller and a thrust bearing plate can be suppressed.

In order to attain the object described above, according to the present invention, there is provided a cylindrical roller bearing, comprising: a plurality of cylindrical rollers; a circular outer race devoid of an annular flange extending from each of opposite axial ends of the outer race in a radial inward direction for controlling the position of the cylindrical rollers in an axial direction; and a circular inner race devoide of an annular flange extending from each of opposite axial ends of the inner race in a radial outward direction for controlling the position of the cylindrical rollers in the axial direction, the cylindrical rollers being disposed between the outer race and the inner race without using a retainer. A pair of thrust bearing plates are disposed on the opposite sides of the outer race for controlling the positions of the outer race and the cylindrical rollers in the axial direction. At least one of the cylindrical rollers is formed shorter than the other cylindrical rollers.

In the cylindrical roller bearing, when an axial load is applied to the outer race, a skew (i.e., inclination of a cylindrical roller with respect to its normal axis of rotation) occurs with some of the cylindrical rollers. However, the skew is taken up or canceled out by circumferential gaps formed between the shorter cylindrical roller and adjacent ones of the other cylindrical rollers at opposite longitudinal ends of the shorter cylindrical roller. Thus, the skew is not transmitted to the remaining ones of the cylindrical rollers. As a result, even when the outer race of the cylindrical roller bearing rotates in this state, the rotation of the outer race is stable, and the end faces of the remaining cylindrical rollers are not brought into contact with the thrust bearing plates. Accordingly, abrasion of the end faces of the cylindrical rollers and the annular thrust bearing plates by sliding movement between them can be suppressed.

Further, when the outer race of the cylindrical roller bearing is subjected to an axial load tending to displace the outer race in an axial direction, the position of the outer race in the axial direction is controlled by the thrust bearing plates.

Thus, with the cylindrical roller bearing, the following advantages are achieved.

First, when an axial load is applied to the outer race of the cylindrical roller bearing while the outer race is rotating, a possible skew is taken up or canceled out by the circumferential gaps formed between the cylindrical roller or rollers having the smaller length and adjacent ones of the resin cylindrical rollers. Accordingly, the rotation of the outer race is stable, and abrasion of the end faces of the cylindrical rollers and the thrust bearing plates by sliding contact between them can be suppressed.

Second, when the outer race of the cylindrical roller bearing is subjected to an axial load, the axial position of the outer race is controlled by the thrust bearing plates.

Third, even when an axial load is applied to the outer race of the cylindrical roller bearing, since a possible skew is taken up or canceled out by the circumferential gaps formed between the shorter cylindrical roller or rollers and adjacent ones of the cylindrical rollers, abrasion of the end faces of the cylindrical rollers and the thrust bearing plates by sliding contact between them can be suppressed. Accordingly, in the case of the roller bearing including steel cylindrical rollers and resin cylindrical rollers arranged alternately as the rolling members, such a cylindrical roller bearing can be used without lubrication for a longer period of time than the conventional unlubricated cylindrical roller bearing described hereinabove.

The above and other objects, features and advantages of the present invention will become apparent from the following description, taken in conjunction with the accompanying drawings in which like parts or elements denoted by like reference symbols.

BRIEF DESCRIPTION OF THE DRAWINGS

FIG. 1A is a front elevational view showing the structure of a cylindrical roller bearing, with one of a pair of thrust bearing plates removed, according to an embodiment of the present invention;

FIG. 1B is a side elevational sectional view of the cylindrical roler bearing with an outer race and the thrust bearing plates shown in cross section; and FIG. 2 is an exploded perspective view showing an example of a chain in which the cylindrical roller bearing according to the present invention is incorporated.

DESCRIPTION OF THE PREFERRED EMBODIMENT

Referring first to FIGS. 1A and 1B, there is shown the structure of a cylindrical roller bearing 1 according to an embodiment of the present invention. The cylindrical roller bearing 1 includes a circular outer race 2, a circular inner race 3 concentric to the outer race 2, and a plurality of cylindrical rollers 4 made of steel and a plurality of cylindrical rollers 5 made of resin disposed alternately to each other as rolling members between the outer race 2 and the inner race 3 without using a retainer such that the cylindrical rollers 4, 5 disposed in lateral juxtaposition within an annular space defined between the outer and inner races 2 and 3. The outer race 2 is devoid of annular flanges extending from opposite axial ends of the outer race 2 in a radial inward direction for controlling the axial position of the cylindrical rollers 4, 5. Similarly, the inner race 3 is devoid of annular flanges extending from opposite axial ends of the inner race 2 in a radial outward direction for controlling the axial position of the cylindrical rollers 4, 5. Those two of the plurality of steel cylindrical rollers 4 which are denoted by 4' in FIGS. 1A and 1B are formed shorter than the other cylindrical rollers 4 and 5. A pair of annular thrust bearing plates 6 are fitted on and secured to an outer periphery of the inner race 3 on the opposite sides of the outer race 2. The thrust beading plates 6 are normally separated from opposite end faces of the outer race 2 and respective opposite end faces of the cylindrical rollers 4, 4', 5, as shown in FIG. 1B. The thrust bearing plates 6 control the axial positions of the outer race 2 and cylindrical rollers 4 and 5.

In the cylindrical roller bearing 1 described above, when an axial load is applied to the outer race 2, a skew occurs with some of the steel cylindrical rollers 4 or the resin cylindrical rollers 5. However, the skew is taken up or canceled out by circumferential gaps G (FIG. 1B) defined between the two cylindrical rollers 4' having a comparatively small length and adjacent ones of the resin cylindrical rollers 5 at opposite longitudinal ends of the shorter cylindrical rollers 4'. Consequently, the skew is not transmitted to the remaining ones of the cylindrical rollers 4 and 5. As a result, even when the outer race 2 of the cylindrical roller bearing 1 rotates in this state, the rotation of the outer race 2 is stable, and the end faces of the remaining cylindrical rollers 4 and 5 are not brought into contact with the annular thrust bearing plates 6. Accordingly, abrasion by sliding movement between the end faces of the cylindrical rollers 4 and 5 and the annular thrust bearing plates 6 can be suppressed.

Further, when an axial load is applied to the outer race 2 of the cylindrical roller bearing 1, the axial position of the outer race 2 is controlled by the annular thrust bearing plates 6.

In addition, even when an axial load is applied to the outer race 2 of the cylindrical roller bearing 1, since abrasion of the end faces of the cylindrical rollers 4 and 5 and the annular thrust bearing plates 6 by sliding contact between them can be suppressed by the circumferential gaps G (FIG. 1B) between the two shorter cylindrical rollers 4' and adjacent ones of the resin cylindrical rollers 5, the cylindrical roller bearing 1 including the steel cylindrical rollers 4 and the resin cylindrical rollers 5 arranged alternately as rolling members can be used without lubrication for a longer period of time than the conventional unlubricated cylindrical roller bearing described hereinabove.

In order to provide a prolonged service life of the cylindrical roller bearing 1 without lubrication, it is preferable that the cylindrical rollers formed shorter than the remaining cylindrical rollers are made of steel and not of synthetic resin.

FIG. 2 shows an example of a chain to which the cylindrical roller bearing according to the present invention is applied. Referring to FIG. 2, the chain 10 includes a pair of inner plates 11 connected with each other by a bush 15 in the form of a hollow post. A pair of outer plates 12 are disposed in an overlapping relationship on the opposite outer sides of the inner plates 11 and connected to each other by a pin 13 extending through the bush 15 such that the inner plates 11 and the outer plates 12 are yieldably deflectable. A plurality of cylindrical rollers 16 made of steel and a plurality of cylindrical rollers 17 made of resin are disposed alternately as rolling members on an outer periphery of the bush 15 without using a retainer. A roller 14 is in the form of a ring made of steel and has no radially inwardly extending flanges at opposite axial ends thereof for controlling the axial position of the cylindrical rollers 16 and 17. The roller 14 is fitted for rotation on an outer periphery of the cylindrical rollers 16 and 17.

The steel cylindrical rollers 16 and the resin cylindrical rollers 17 are disposed in juxtaposition with each other within an annular space defined between the roller (outer race) 14 and the bush (inner race) 15. One of the steel cylindrical rollers 16 which is denoted by 16' is formed shorter than the other cylindrical rollers 16 and 17. Further, a pair of annular thrust bearing plates 18 are fitted on the outer periphery of the bush 15 and disposed between a pair of opposing inner side faces of the inner plates 11 and the opposite outer side faces of the roller 14. Though not shown, the thrust bearing plates 18 are normally separated from opposite end faces of the roller 14 and respective opposite end faces of the cylindrical rollers 16, 16', 17, as in the case of the cylindrical roller bearing 1 shown in FIG. 2A. The thrust bearing plates 18 are provided to control the axial positions of the roller 14 and cylindrical rollers 16 and 17.

In the chain 10 of the foregoing construction, the roller 14 acts as an outer race of a cylindrical roller bearing, the steel cylindrical rollers 16 and 16' and the resin cylindrical rollers 17 act as rolling members of the cylindrical roller bearing, and the bush 15 acts as an inner race of the cylindrical roller bearing. Accordingly, the roller 14, the steel cylindrical rollers 16 and 16' and the resin cylindrical rollers 17, and the bush 15 cooperatively form a cylindrical roller bearing of the type devoid of a retainer for holding the rolling members 16, 16', 17.

In the chain 10 shown in FIG. 2, when an axial load is applied to the roller (outer race) 14 of the chain 10, a skew occurs with some of the steel cylindrical rollers 16 and/or the resin cylindrical rollers 17. However, the skew is taken up or canceled out by circumferential gaps G defined between the single steel cylindrical roller 16' having a comparatively small length and adjacent ones of the resin cylindrical rollers 17 at opposite longitudinal ends of the shorter cylindrical roller 16', and consequently, the skew is not transmitted to the other cylindrical rollers 16 and 17. As a result, even when the roller 14 of the chain 10 rotates in this state, the rotation of the roller 14 is stable, and the remaining cylindrical rollers 16 and 17 are not displaced in the axial direction. Consequently, end faces of the remaining cylindrical rollers 16 and 17 are not brought into contact with the annular thrust bearing plates 18. Accordingly, abrasion of the end faces of the cylindrical rollers 16 and 17 and the thrust bearing plates 18 by sliding contact between them can be suppressed.

Further, when the roller 14 of the chain 10 is subjected to an axial load, the axial position of the roller 14 is controlled by the annular thrust bearing plates 18.

In addition, even when an axial load is applied to the roller 14 of the chain 10, since friction between the end faces of the cylindrical rollers 16 and 17 and the annular thrust bearing plates 18 by sliding contact between them can be suppressed by the circumferential gaps G between the single steel cylindrical roller 16' having a comparatively small length and adjacent ones of the resin cylindrical rollers 17, the chain 10 including the steel cylindrical rollers 16 and resin cylindrical rollers 17 arranged alternately as rolling members can be used without lubrication for a longer period of time than the conventional unlubricated cylindrical roller bearing described hereinabove.

In order to provide a prolonged service life of the chain 10 without lubrication, it is preferable that the cylindrical roller formed shorter than the remaining cylindrical rollers is made of steel and not of synthetic resin.

Although in the cylindrical roller bearing 1 described hereinabove with reference to FIGS. 1A and 1B, the steel cylindrical rollers 4 and 4' and the resin cylindrical rollers 5 are disposed alternately as rolling members between the outer race 2 and the inner race 3 without using a retainer, the cylindrical roller bearing of the present invention is not limited to this, and all of the rolling members may be formed from cylindrical rollers made of steel.

Further, in the cylindrical roller bearing 1 described hereinabove with reference to FIG. 1, two ones 4' of the steel cylindrical rollers 4 are formed shorter. The number of the shorter cylindrical roller should by no means be limited to two as in the illustrated embodiment but may include and any number including one. In other words, at least one cylindrical roller formed shorter than the remaining Roulers is enough to achieve the prescribed object of the present invention.

Similarly, in the chain 10 shown in FIG. 2 to which the cylindrical roller bearing according to the present invention is applied, the steel cylindrical rollers 16 and 16' and the resin cylindrical rollers 17 are disposed alternately as rolling members between the roller 14 and the bush 15 without using a retainer. The chain 10 is not limited to this, and all of the rolling members may be formed as cylindrical rollers made of steel.

Further, in the chain 10 shown in FIG. 2, a single one 16' of the steel cylindrical rollers 16 is formed shorter. The present invention is not limited to the illustrated embodiment but may include two or more cylindrical rollers formed shorter than the remaining cylindrical rollers.

While a preferred embodiment of the present invention has been described using specific terms, such description is for illustrative purposes only, and it is to be understood that changes and variations may be made without departing from the spirit or scope of the following claims.

What is claimed is:

1. A cylindrical roller bearing, comprising:
   a plurality of cylindrical rollers;
   a circular outer race devoid of an annular flange extending from each of opposite axial ends of said outer race in a radial inward direction for controlling the position of said cylindrical rollers in an axial direction;
   a circular inner race devoid of an annular flange extending from each of opposite axial ends of said inner race in a radial outward direction for controlling the position of said cylindrical rollers in the axial direction;
   said cylindrical rollers being disposed between said outer race and said inner race without using a retainer; and
   a pair of thrust bearing plates disposed on the opposite sides of said outer race for controlling the positions of said outer race and said cylindrical rollers in the axial direction,
   wherein at least one of said cylindrical rollers is formed shorter than the other cylindrical rollers.

2. A cylindrical roller bearing according to claim 1, wherein said cylindrical rollers are comprised of a plurality of cylindrical rollers made of steel and a plurality of cylindrical rollers made of resin and arranged alternately with said steel cylindrical rollers, and said at least one cylindrical roller which is formed shorter than the other cylindrical rollers is one of said steel cylindrical rollers.

3. A cylindrical roller bearing according to claim 1, wherein said thrust bearing plates are secured to an outer periphery of said inner race and normally separated from opposite end faces of said outer race and respective opposite end faces of said cylindrical rollers.

4. A cylindrical roller bearing according to claim 3, wherein said cylindrical rollers are comprised of a plurality of cylindrical rollers made of steel and a plurality of cylindrical rollers made of resin and arranged alternately with said steel cylindrical rollers, and said at least one cylindrical roller which is formed shorter than the other cylindrical rollers is one of said steel cylindrical rollers.

* * * * *